US007155086B2

(12) United States Patent
Saida et al.

(10) Patent No.: US 7,155,086 B2
(45) Date of Patent: Dec. 26, 2006

(54) OPTICAL SIGNAL PROCESSING DEVICE USING OPTICAL GATE

(75) Inventors: Takashi Saida, Mito (JP); Katsunari Okamoto, Mito (JP); Koichi Takiguchi, Mito (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/802,168

(22) Filed: Mar. 8, 2001

(65) Prior Publication Data

US 2001/0022878 A1     Sep. 20, 2001

(30) Foreign Application Priority Data

Mar. 9, 2000    (JP)    ............................ P2000-064364

(51) Int. Cl.
*G02B 6/26* (2006.01)
*G02F 7/00* (2006.01)
*H04J 14/08* (2006.01)

(52) U.S. Cl. ............................ 385/27; 385/24; 385/37; 398/102

(58) Field of Classification Search .................. 385/27, 385/39, 14, 15, 1, 24, 37, 52, 53, 54, 98, 385/102; 359/109; 398/161, 52, 53, 54, 398/98, 102
See application file for complete search history.

(56) References Cited

U.S. PATENT DOCUMENTS

| 3,838,278 | A | * | 9/1974 | Duguay et al. ......... 250/227.12 |
| 5,010,346 | A | * | 4/1991 | Hamilton et al. ............ 341/137 |
| 5,239,598 | A | | 8/1993 | Wight et al. |
| 5,414,548 | A | * | 5/1995 | Tachikawa et al. ............ 398/87 |
| 5,546,483 | A | * | 8/1996 | Inoue et al. ................... 385/14 |
| 5,748,811 | A | * | 5/1998 | Amersfoort et al. ........... 385/15 |
| 5,786,913 | A | | 7/1998 | Pfeiffer |
| 5,828,472 | A | | 10/1998 | Masetti |
| 5,937,117 | A | * | 8/1999 | Ishida et al. ................... 385/24 |
| 5,982,515 | A | * | 11/1999 | Stone et al. ................. 398/161 |
| 6,421,478 | B1 | * | 7/2002 | Paiam ........................... 385/24 |
| 6,708,003 | B1 | * | 3/2004 | Wickham et al. ............ 398/102 |

FOREIGN PATENT DOCUMENTS

| EP | 0 255 270 A | 2/1988 |
| EP | 0 297 851 A | 1/1989 |
| JP | 56-135827 | 10/1981 |
| JP | 09-258045 | * 10/1997 |
| JP | 11-055320 | * 2/1999 |

(Continued)

OTHER PUBLICATIONS

I. Glesk et al., "Demonstration of ultrafast all-optical packet routing", Electronics Letters, IEE Stevenage, GB, vol. 33, No. 9, Apr. 24, 1997, pp. 794-795, XP006007361.

(Continued)

*Primary Examiner*—Edward J. Glick
*Assistant Examiner*—Chih-Cheng Glen Kao
(74) *Attorney, Agent, or Firm*—Kilpatrick Stockton LLP

(57) ABSTRACT

In the disclosed optical signal processing device, the digital-to-analog conversion of the input optical signals is realized in an optical region, without converting the input optical signals into electric signals for the purpose of signal processing, by splitting input optical signals into plural sets, delaying the split optical signals for mutually different delay amounts while adjusting amplitudes of these optical signals, combining these optical signals, and gating these optical signals on a time axis. It is also possible to realize the processing of the optical signals that are multiplexed on a time axis such as interchanges of time-slots similarly.

15 Claims, 9 Drawing Sheets

FOREIGN PATENT DOCUMENTS

JP          11133364 A  *   5/1999

OTHER PUBLICATIONS

L.B. Soldano et al., "Optical Multi-Mode Interference Devices Based on Self-Imaging: Principles and Applications", Journal of Lightwave Technology, IEEE. New York, US, vol. 13, No. 4, Apr. 1, 1995, pp. 615-627, XP00051378, ISSN: 0733-8724.

Masetti F. et al., "Optical Fiber Buffer for High-Performance Broadband Switching", European Transactions on Telecommunications and Related Technologies, AEI; Milano, IT, vol. 4, No. 6, Nov. 1, 1993, pp. 671-679, XP000433724, ISSN: 1120-3862.

Pattavina A., "Nonblocking Architectures for ATM Switching", IEEE Communications Magazine, IEEE Service Center, Piscataway, N.J., US, vol. 31, No. 2, Feb. 1, 1993, pp. 38-48, XP000334602, ISSN: 0163-6804.

* cited by examiner

OPTICAL SIGNAL PROCESSING DEVICE USING OPTICAL GATE

BACKGROUND OF THE INVENTION

1. Field of the Invention

The present invention relates to an optical signal processing device for processing optical signals in the field of optical communications.

2. Description of the Background Art

Due to the explosive development of the Internet, there is a major shift in the mainstream of communications from speeches to data. In near future, the majority of signals transmitted through communication paths are expected to become data packets. In conjunction with this change, there is a demand for an evolution of the optical fiber communication system from a simple large capacity communication path to an intelligent network that can process optical signal packets. An optical router that can distribute optical signal packets according to information on a destination of each optical signal is a key constituent element of such a next generation optical communication network.

The most important element in the optical router is a signal processing device for reading information on a destination or the like from the optical signal. Conventionally, this reading of the destination information has been realized by an electronic circuit.

FIG. 11 shows a conceptual configuration of a conventional device for reading the destination information. As shown in FIG. 11, the optical signals (address information, data, etc.) from an optical fiber communication path are separated by an optical tap 110, and converted into electric signals at an opto-electric conversion circuit 111. These converted electric signals are lead to an electric circuit 112 where the destination information is extracted from the data. The optical signals are then processed according to the extracted destination information, by an optical router 113, for example.

However, the conventional signal processing device requires the conversion of the optical signals into the electric signals before the processing at the electric circuit so that there has been a problem that the processing speed of the signal processing device as a whole is limited by the speed of the electric circuit.

The communication capacity required for the optical communication network has been increasing exponentially since the advent of the Internet, but it is impossible to construct an optical communication system of an ultra high speed such as 40 Gbps or 100 Gbps that will be required in the next or next next generation, by the conventional method for carrying out the processing by converting the optical signals into the electric signals.

SUMMARY OF THE INVENTION

It is therefore an object of the present invention to provide an optical signal processing device capable of carrying out the optical signal processing for reading information on a destination or the like from the optical signals at high speed.

According to one aspect of the present invention there is provided an optical signal processing device, comprising: an input optical waveguide; an optical splitter configured to split optical signals entered at the input optical waveguide into plural sets; an optical delay waveguide array formed by a plurality of optical delay waveguides with mutually different delay amounts which are configured to delay the optical signals split by the optical splitter; an optical combiner configured to combine the optical signals delayed by the optical delay waveguide array; an output optical waveguide connected to an output port of the optical combiner; and an optical gate configured to gate the optical signals outputted from the optical combiner or entered into the optical delay waveguide array; wherein at least one of the optical splitter, the optical delay waveguide array, the optical combiner and the optical gate has an optical amplitude adjustment function for adjusting amplitudes of the optical signals.

According to another aspect of the present invention there is provided an optical signal processing device, comprising: an input optical waveguide; an optical splitter configured to split optical signals entered at the input optical waveguide into plural sets; a first optical delay waveguide array formed by a plurality of optical delay waveguides with mutually different delay amounts which are configured to delay the optical signals split by the optical splitter; a plurality of optical gates configured to gate the optical signals respectively provided on the optical delay waveguides and configured to gate the optical signals entered into the optical delay waveguide array; an optical switch for switching the optical signals outputted from the optical delay waveguide array; a second optical delay waveguide array formed by a plurality of optical delay waveguides with mutually different delay amounts which are configured to delay the optical signals switched by the optical switch; an optical combiner configured to combine the optical signals delayed by the second optical delay waveguide array; and an output optical waveguide connected to an output port of the optical combiner.

Other features and advantages of the present invention will become apparent from the following description taken in conjunction with the accompanying drawings.

DETAILED DESCRIPTION OF THE PREFERRED EMBODIMENTS

First Embodiment

Referring now to FIG. 1 to FIG. 7, the first embodiment of the optical signal processing device according to the present invention will be described in detail.

Figure 1:
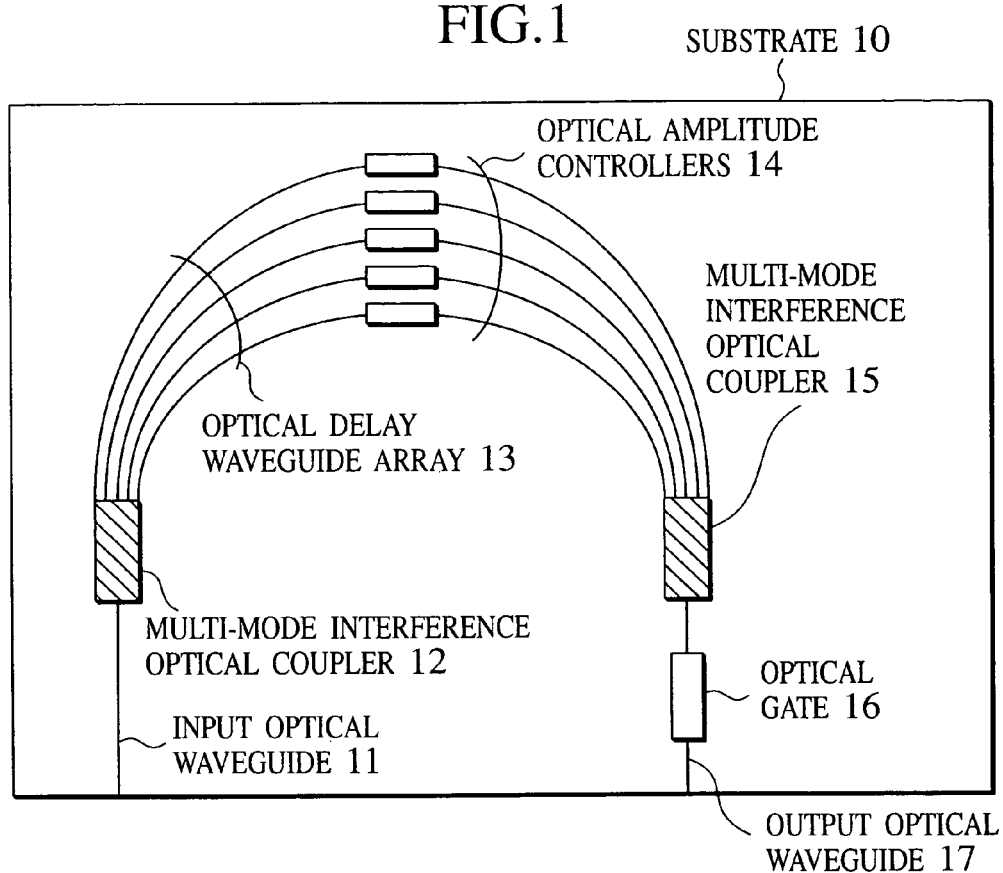
FIG. 1 is a block diagram showing an exemplary configuration of an optical signal processing device according to the first embodiment of the present invention.

FIG. 1 shows an exemplary configuration of the optical signal processing device according to the first embodiment of the present invention.

As shown in FIG. 1, the optical signal processing device of the first embodiment comprises an input optical waveguide 11, a multi-mode interference optical coupler 12 for splitting the input optical signal into N (which is assumed to be five in this embodiment) sets, an optical delay waveguide array 13 with delays sequentially different by $\Delta\tau$ one another, a plurality of optical amplitude controllers 14 provided on respective optical delay waveguides of the optical delay waveguide array 13, a multi-mode interference optical coupler 15 for combing N optical signals, an optical gate 16 connected at an output port of the multi-mode interference optical coupler 15, and an output optical waveguide 17, all of which are provided on a substrate 10.

Here, the input optical waveguide 11, the optical delay waveguide array 13, and the output optical waveguide 17 can be formed by silica-based optical waveguides, for example.

The optical gate 16 can be formed by a semiconductor optical switch, a waveguide non-linear optical loop mirror, a dielectric optical switch, or any other optical switch.

Figure 2:
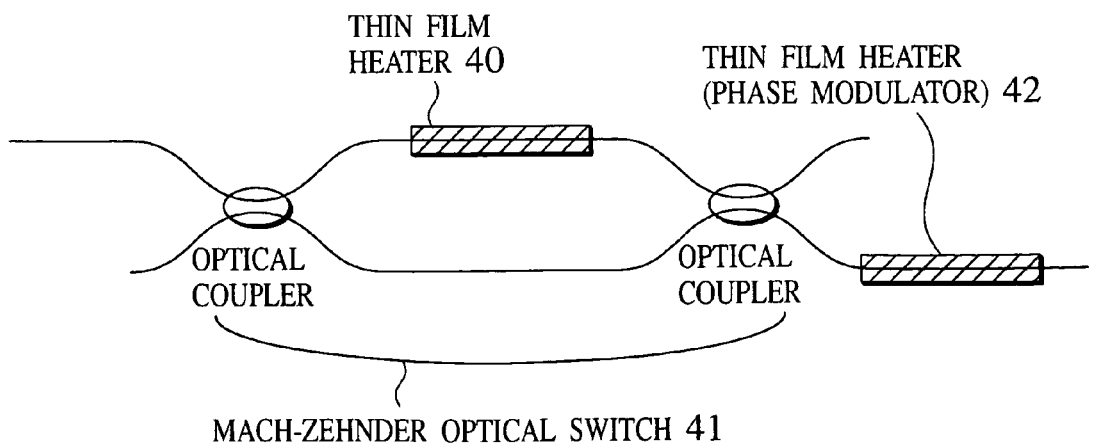
FIG. 2 is a diagram showing an exemplary configuration of an optical amplitude controller used in the optical signal processing device of FIG. 1.

Each optical amplitude controller 14 can be formed by a silica-based optical delay waveguide as shown in FIG. 2, in which a Mach-Zehnder optical switch 41 based on the thermo-optic effect using a thin film heater 40 is combined with a thin film heater (phase modulator) 42 based on the thermo-optic effect. It is also possible to use the optical amplitude controller in any other configuration.

Also, in the first embodiment, the multi-mode interference optical couplers 12 and 15 are used as an optical splitter and an optical combiner, because this configuration can provide stable optical splitting and optical combining in a compact configuration. However, the present invention is not necessarily limited to this example, and it is also possible to use the other optical splitters or optical combiners such as directional couplers connected in a tree shape or a tap shape.

In addition, in the first embodiment, the optical amplitude controllers 14 are provided on the optical delay waveguide array 13, because this configuration can realize the optical amplitude adjustment in which a manufacturing error can be corrected later on and an amplitude adjustment amount can be changed later on. However, the present invention is not necessarily limited to this example, and it is also possible to realize the optical amplitude adjustment by using an optical coupler with an uneven splitting ratio in the multi-mode interference optical coupler 12 provided as an optical splitter, or by using an optical coupler of an uneven splitting radio in the multi-mode interference optical coupler 15 provided as an optical combiner. It is also possible to realize the optical amplitude adjustment by using both of them, or by using either one or both of them in combination with the optical amplitude controllers 14 provided on the optical delay waveguide array 13.

Next, the operation of the optical signal processing device of the first embodiment will be described in detail with references to the drawings.

Figure 3:
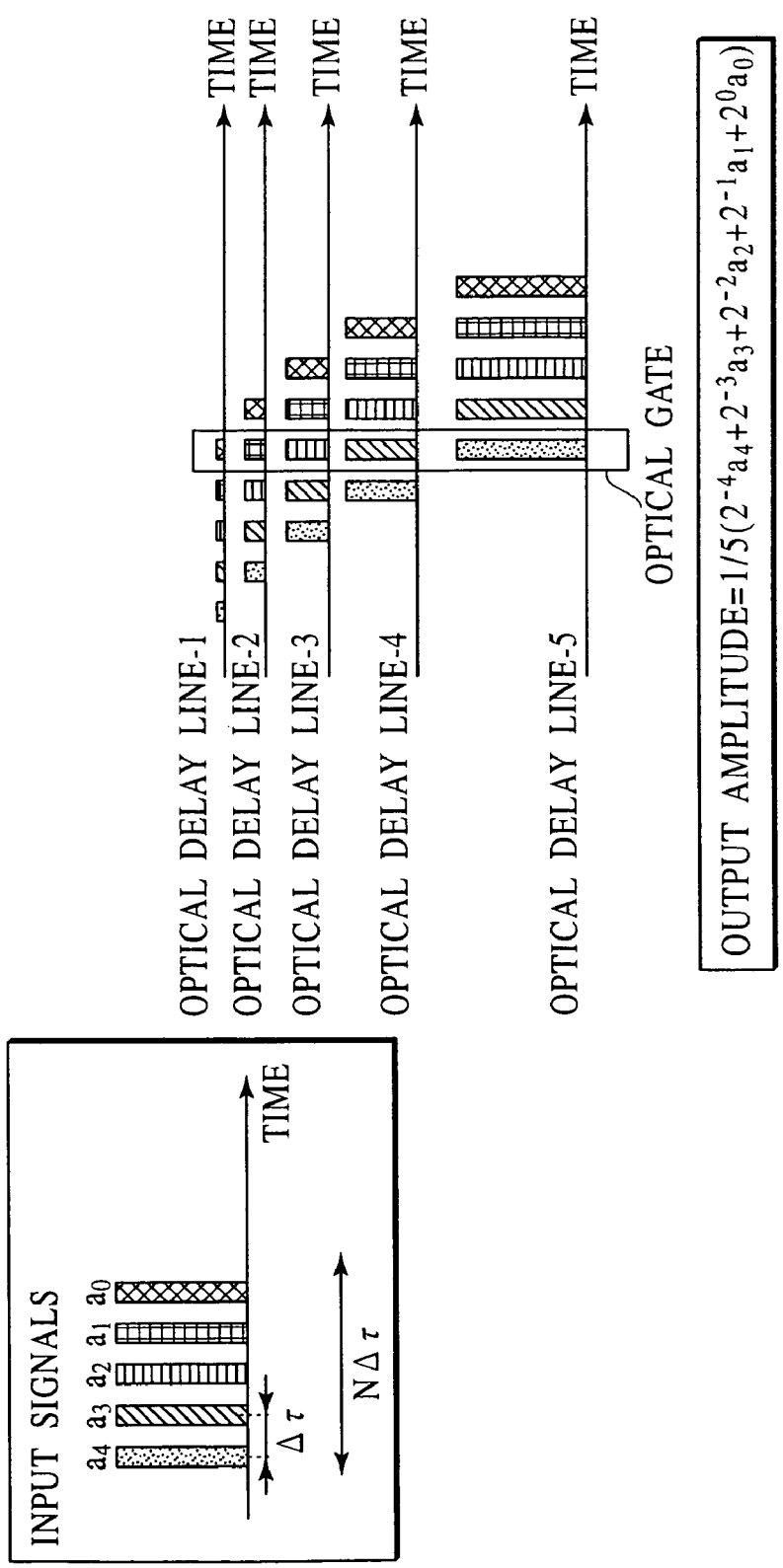
FIG. 3 is a diagram for explaining the operation of the optical signal processing device according to the first embodiment of the present invention.

FIG. 3 shows an exemplary case of recognizing an optical pulse sequence by the optical signal processing device of the first embodiment. Here, the input optical pulse sequence is assumed to be formed by 5 bits signals [$a_4, a_3, a_2, a_1, a_0$], where each bit has a value 1 or 0.

In the optical signal processing device of the first embodiment, this input optical pulse sequence is split by the multi-mode interference optical coupler 12 first. Then, the split optical pulse sequences are respectively delayed in units of time-slots by the optical delay waveguide array 13, where one time-slot is given by an interval $\Delta\tau$ between adjacent pulses. The delayed optical pulse sequences are then combined by the multi-mode interference optical coupler 15, and a prescribed time-slot region is extracted by the optical gate 16.

At this point, when the amplitude adjustment amounts of the optical delay waveguide array 13 are respectively given by [$2^{-4}, 2^{-3}, 2^{-2}, 2^{-1}, 2^0$], the light intensities outputted from the optical gate 16 can be expressed by the following equation (1).

$$S = \left| \frac{1}{5}(2^{-4}a_4 + 2^{-3}a_3 + 2^{-2}a_2 + 2^{-1}a_1 + 2^\theta a_0 \theta) \right|^2 \quad (1)$$

More generally, when the amplitude adjustment amounts of the optical delay waveguide array 13 are respectively given by [$2^{-(n-1)}, 2^{-(n-2)}, \ldots, 2^{-1}, 2^0$], the light intensities outputted from the optical gate 16 can be expressed by the following equation (2).

$$S = \left| \frac{1}{n}(2^{-(n-1)}a_{n-1} + 2^{-2(n-2)}a_{n-2} + \ldots + 2^{-1}a_1 + 2^\theta a_\theta) \right|^2 \quad (2)$$

Figure 11:
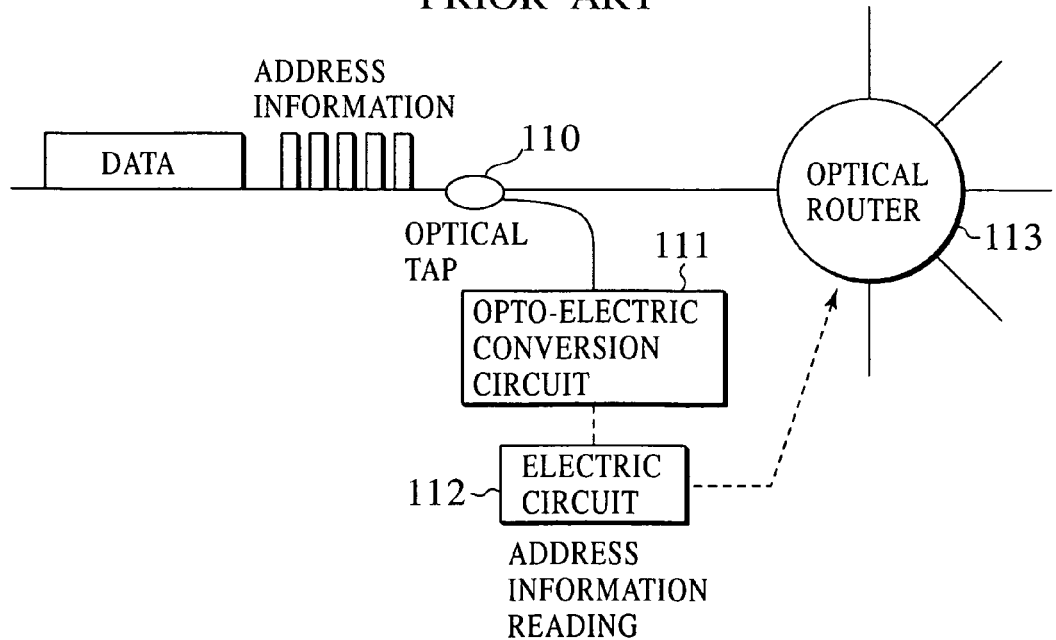
FIG. 11 is a block diagram showing an example of a conventional optical signal processing device.

It can be seen from this equations (1) and (2) that the amplitude of the output signal S effectively gives the digital-to-analog conversion of the input signal. Conventionally, it has been necessary to convert pulses of the optical pulse sequence into electric signals one by one in order to recognize the content of the optical pulse sequences. In contrast, the digital-to-analog conversion of the optical signals can be realized in an optical region according to the configuration of the first embodiment, so that the optical pulses can be recognized by an electric processing device with a processing speed slower than the speed of the optical pulse sequence. Namely, when the optical signal processing device of FIG. 1 is inserted between the optical tap 110 and the opto-electric conversion circuit 111 in FIG. 11, the optical gate 16 outputs only a signal for one time-slot extracted from every five time-slots of the input optical pulse sequence, for example, so that it suffices for the electric circuit 112 to be operated at ⅕ of the speed of the input optical pulse sequence.

Note that FIG. 3 shows an exemplary case of recognizing contents of all bits, but the present invention is not necessarily limited to this case and it is also possible to recognize only a part of the input optical pulse sequence. For example, by setting the amplitude adjustment amounts of the optical delay waveguide array 13 as [$2^{-2}, 0, 2^{-1}, 0, 2^0$], it is possible to obtain the digital-to-analog conversion of the contents of only the first, third and fifth bits Note also that the amplitude adjustment amounts are set to be totally different from each other as in the case of $[2^{-4}, 2^{-3}, 2^{-2}, 2^{-1}, 2^0]$ described above, but the present invention is not necessarily limited to this case, and any other combinations can be used. For example, by setting the amplitude adjustment amounts to $[1, -1, 1, -1, 1]$ (where the minus sign can be realized by the phase modulation), it is possible to compare the number of bits contained at the odd numbered positions in the data sequence and the number of bits contained at the even numbered positions in the data sequence so that this optical signal processing device of FIG. 1 can be utilized as a parity check device.

As described above, the optical signal processing device of the first embodiment uses an optical splitter for splitting input optical signals into plural sets, an optical delay waveguide array with mutually different delay amounts, optical amplitude controllers for adjusting amplitudes of the optical signals lead to the optical delay waveguide array, an optical combiner for combining optical signals from the optical delay waveguide array, and an optical gate for gating the optical signals on a time axis, so that it becomes possible to realize the digital-to-analog conversion of the input optical signals in an optical region, and therefore it becomes possible to provide the optical signal processing device that can handle high speed optical signals by using a relatively slow electric circuit. Such a processing of the optical signals can be utilized in reading of information on a destination of the optical signals, for example.

Figure 4:
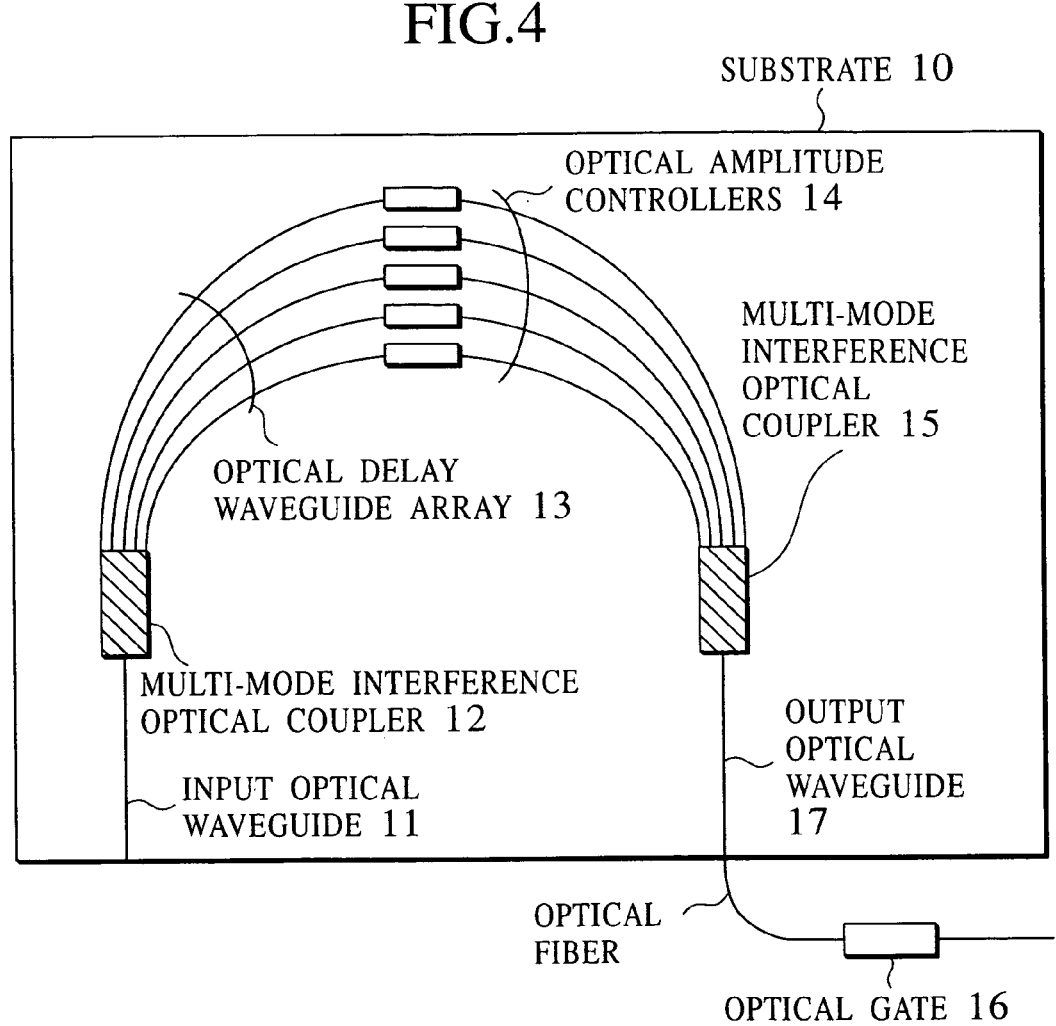
FIG. 4 is a block diagram showing one modified configuration of an optical signal processing device according to the first embodiment of the present invention.

FIG. 4 shows one modified configuration of the optical signal processing device of the first embodiment. This optical signal processing device of FIG. 4 is formed by the same constituent elements as the optical signal processing device of FIG. 1, but different from the optical signal processing device of FIG. 1 in that the optical gate 16 is provided outside the substrate 10 as an individual component rather than on the substrate 10. Even in such a modified configuration, the recognition of the optical pulse sequence can be realized similarly as the optical signal processing device of FIG. 1.

In the optical signal processing device of FIG. 4, the optical gate 16 is not provided on the substrate 10 so that the optical gate 16 can be provided in various different forms including an optical fiber non-linear optical loop mirror in addition to a semiconductor optical switch, a waveguide non-linear optical loop mirror and a dielectric optical switch mentioned above FIG. 5 shows another modified configuration of the optical signal processing device of the first embodiment. This optical signal processing device of FIG. 5 has basically the same configuration as the optical signal processing device of FIG. 1 except that a TE/TM converter 18 is inserted in a middle of the optical delay waveguide array 13.

With this configuration, it becomes possible to realize the polarization independent operation in the device as a whole even when the optical delay waveguide array 13 has birefringence.

Figure 6:
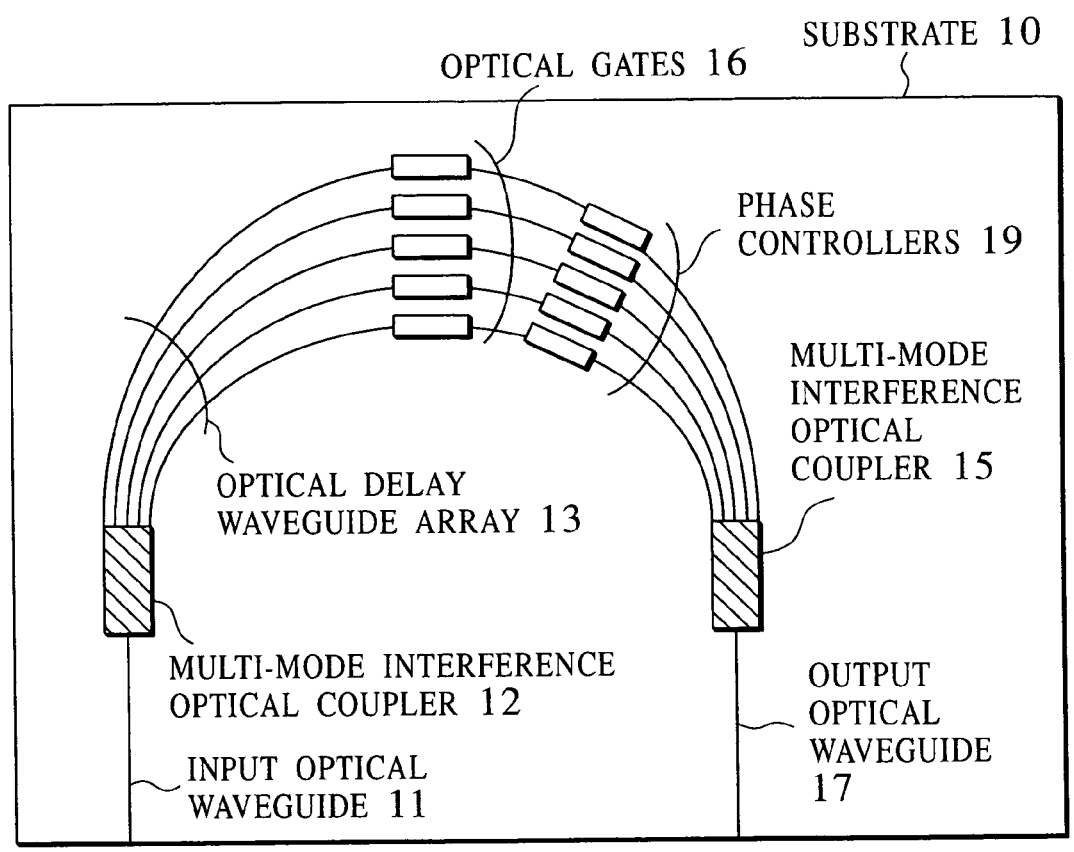
FIG. 6 is a block diagram showing another modified configuration of an optical signal processing device according to the first embodiment of the present invention.

FIG. 6 shows another modified configuration of the optical signal processing device of the first embodiment. This optical signal processing device of FIG. 6 also has basically the same configuration as the optical signal processing device of FIG. 1 but differs from the optical signal processing device of FIG. 1 in that a plurality of optical gates 16 are provided on respective optical delay waveguides of the optical delay waveguide array 13, instead of the signal optical gate 16 provided after the multi-mode interference optical coupler 15. Even in such a configuration, exactly the same functions as those of the optical signal processing device of FIG. 1 can be realized.

Moreover, in this case, the amplitude adjustment function can be realized by adjusting a gain (or a loss) of each optical gate 16.

Note however that the adjustment of the gain (or the loss) of the optical gate 16 usually also changes the amount of phase shift in lights. In order to compensate for that, the optical signal processing device of FIG. 6 also incorporates a plurality of phase controllers 19 on respective optical delay waveguides of the optical delay waveguide array 13. The phase shifts in lights caused by the optical gates 16 can be compensated by these phase controllers 19.

Note also that these phase controllers 19 are unnecessary when the optical delay waveguide array 13 is designed by taking the phase shifts due to the amplitude adjustment into account.

Figure 7:
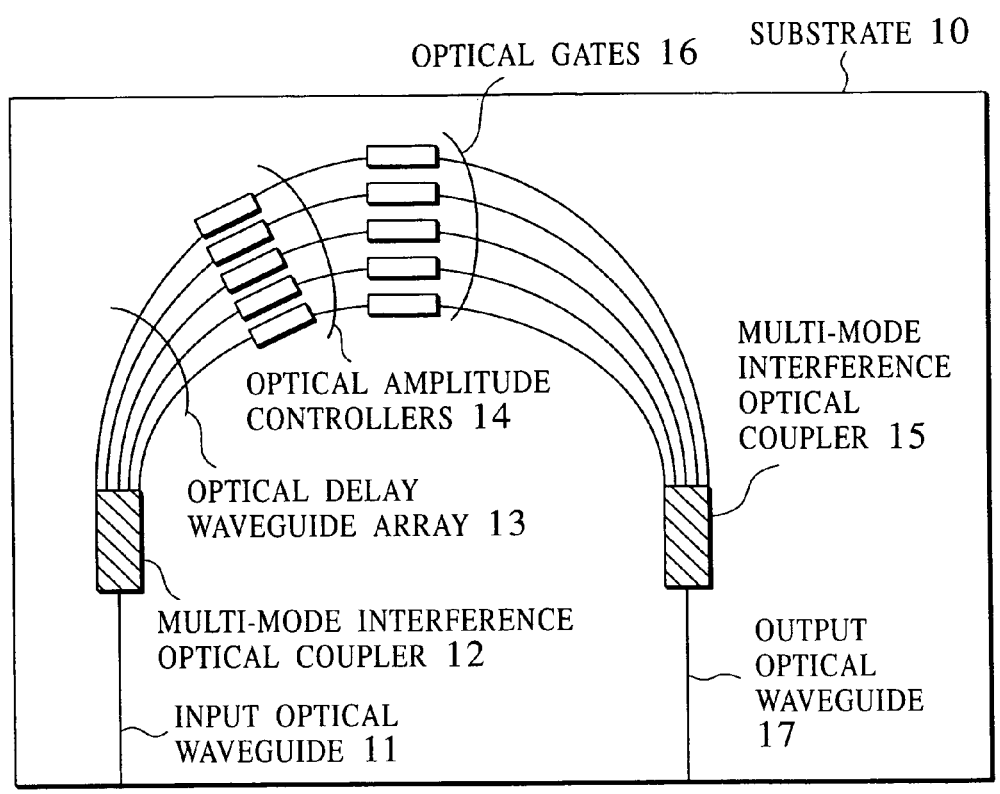
FIG. 7 is a block diagram showing another modified configuration of an optical signal processing device according to the first embodiment of the present invention.

FIG. 7 shows another modified configuration of the optical signal processing device of the first embodiment. This optical signal processing device of FIG. 7 differs from the optical signal processing device of FIG. 6 in that the plurality of optical amplitude controllers 14 are provided on the respective optical delay waveguides of the optical delay waveguide array 13 instead of the phase controllers 19, along with the optical gates 16. Namely, in the optical signal processing device of FIG. 6, the amplitude adjustment function is realized by the optical gates 16. However, the present invention is not necessarily limited to this case and it is also possible to realize the amplitude adjustment function by the amplitude controllers 14 rather than by the optical gates 16.

Second Embodiment

Figure 8:
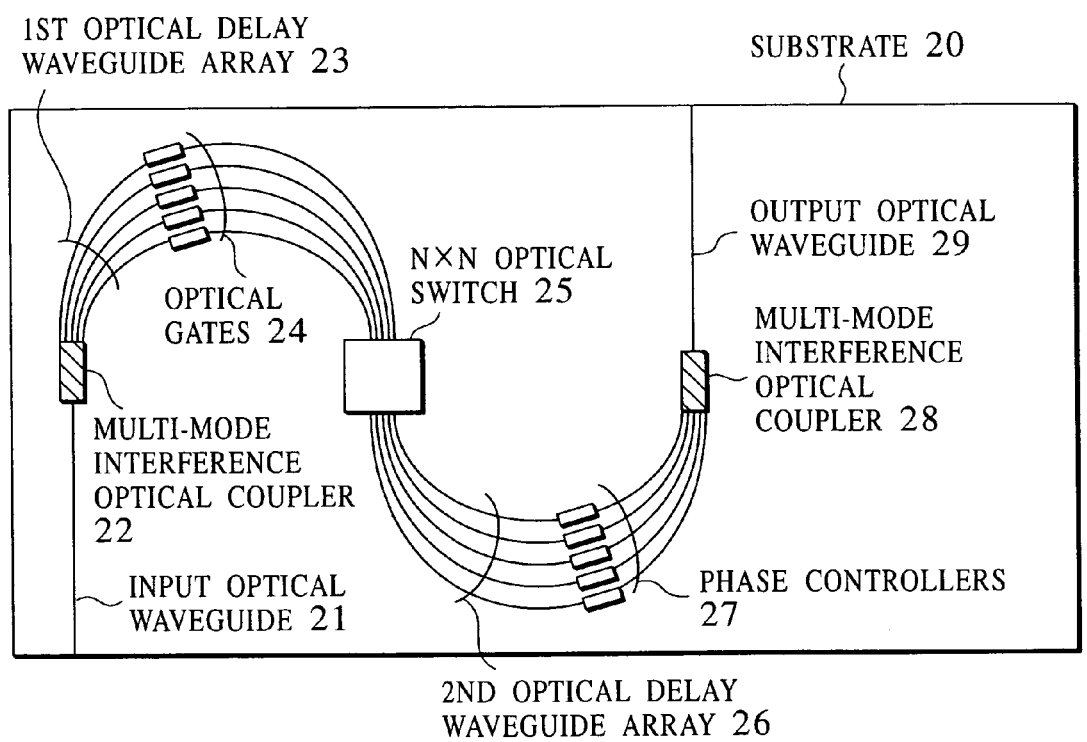
FIG. 8 is a block diagram showing an exemplary configuration of an optical signal processing device according to the second embodiment of the present invention.
Figure 9:
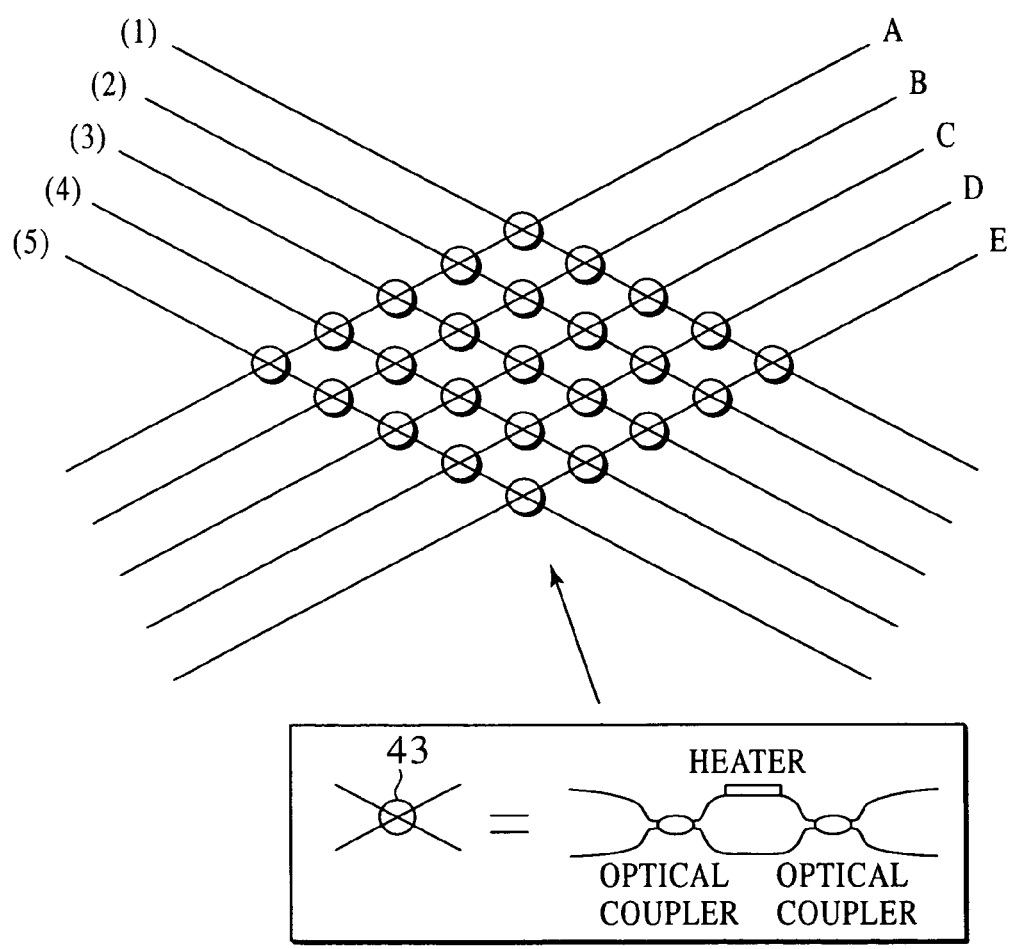
FIG. 9 is a diagram showing an exemplary configuration of an N×N optical switch used in the optical signal processing device of FIG. 8.
Figure 10:
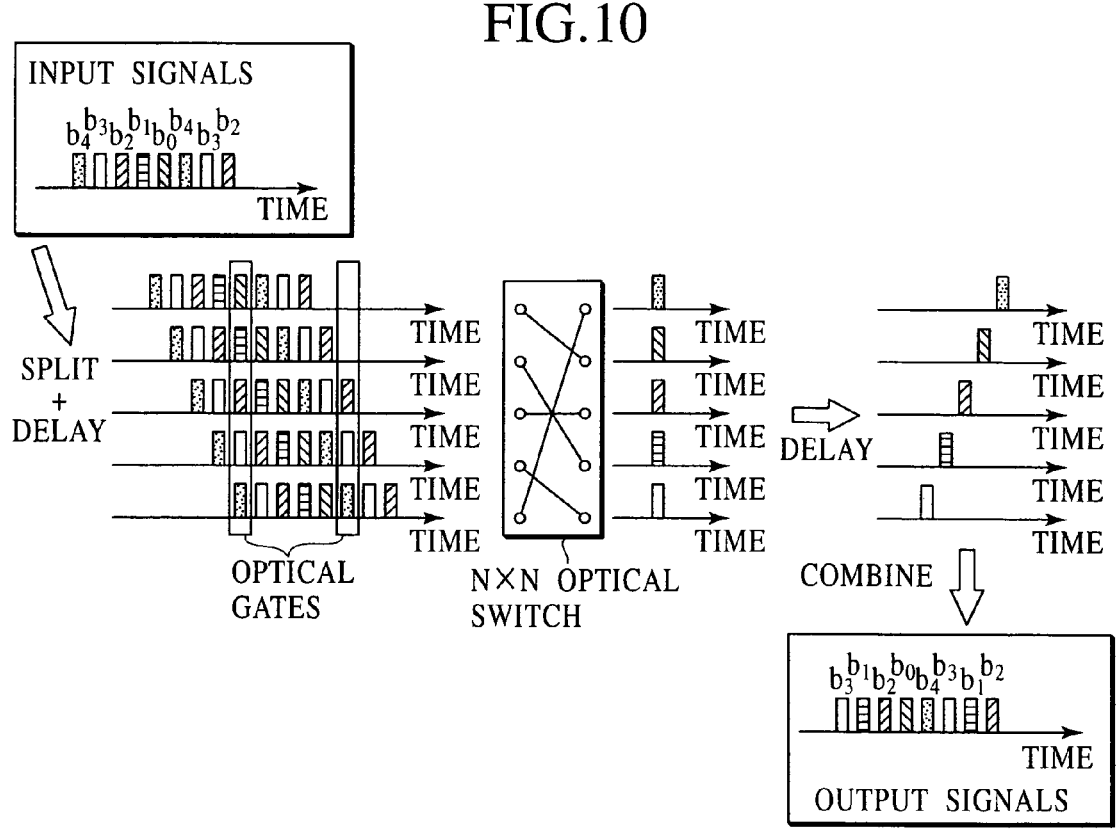
FIG. 10 is a diagram for explaining the operation of the optical signal processing device according to the second embodiment of the present invention.

Referring now to FIG. 8 to FIG. 10, the second embodiment of the optical signal processing device according to the present invention will be described in detail.

FIG. 8 shows an exemplary configuration of the optical signal processing device according to the second embodiment of the present invention.

As shown in FIG. 8, the optical signal processing device of the second embodiment comprises an input optical waveguide 21, a multi-mode interference optical coupler 22 for splitting the input optical signal, a first optical delay waveguide array 23 for giving delays to the split optical signals, a plurality of optical gates 24 provided on respective optical delay waveguides of the first optical delay waveguide array 23, an N×N optical switch 25 with an input connected to the first optical delay waveguide array 23, a second optical delay waveguide array 26 connected to an output of the N×N optical switch 25, a plurality of phase controllers 27 provided on respective optical delay waveguides of the second optical delay waveguide array 26, a multi-mode interference optical coupler 28 for combing optical signals from the second optical delay waveguide array 26, and an output optical waveguide 29 connected to an output port of the multi-mode interference optical coupler 28, all of which are provided on a substrate 20.

Here, in the second embodiment, the multi-mode interference optical couplers 22 and 28 are used as an optical splitter and an optical combiner, because this configuration can provide stable optical splitting and optical combining in a compact configuration. However, the present invention is not necessarily limited to this example, and it is also possible to use the other optical splitters or optical combiners such as directional couplers connected in a tree shape or a tap shape.

Also, the phase controllers 27 are provided because there can be cases where it is preferable to align phaes of the output signals, but these phase controllers 27 are not indispensable elements of the optical signal processing device of this embodiment so that they may be omitted.

FIG. 9 shows an exemplary configuration of the N×N optical switch 25 used in the optical signal processing device of FIG. 8. As shown in FIG. 9, the N×N optical switch 25 is a matrix switch in a non-blocking configuration. The matrix switch shown in FIG. 9 has input ports (1) to (5) and output ports A to E, which are arranged to cross with each other. At each intersection, a thermo-optic switch 43 in a form of a Mach-Zehndner optical switch is provided, such that the optical signals entered at the input ports (1) to (5) are connected to the output ports A to E according to the states of these switches.

Here, the N×N optical switch 25 shown in FIG. 9 is realized by using thermo-optic switches because this configuration can realize a compact switch stably. However, the present invention is not necessarily limited to this example, and can be realized by using any other switches such as switches using electro-optic effect, switches using micro-machines, all optical switches, etc.

Also, the N×N optical switch 25 shown in FIG. 9 has a non-blocking configuration, because this configuration can change the state of each switch without affecting the connection states of the other switches. However, the present invention is not necessarily limited to this example, and can be realized without using the non-blocking configuration.

Next, the operation of the optical signal processing device of the second embodiment will be described in detail with references to the drawings.

FIG. 10 shows an exemplary case of interchanging the optical signals that are multiplexed on a time axis by the optical signal processing device of the second embodiment.

Suppose now that the input optical signals are 5 bits optical signals $[b_4, b_3, b_2, b_1, b_0]$, which are multiplexed on a time axis.

In the optical signal processing device of the second embodiment, these input optical signals are split by the multi-mode interference optical coupler 22, and delayed by the first optical delay waveguide array 23 for the respective number of time-slots, where one time-slot is given by an interval between adjacent optical signals. Then, the delayed optical signals are extracted by the respective optical gates 24 such that the 5 bits of the optical signals are extracted at the same timing.

The demultiplexed optical signals are then lead to the N×N optical switch 25, where the 5 bits of the optical signals are lead to appropriate optical delay waveguides of the second optical delay waveguide array 26 in a desired combination according to the state of the switch. Then, these optical signals are delayed by the second optical delay waveguide array 26 for the respective number of time-slots, combined by the multi-mode interference optical coupler 28, and lead to the output optical waveguide 29.

As a result, the input optical signals are interchanged on a time axis in the output optical signals at the output optical waveguide 29, as $[b_3, b_1, b_2, b_0, b_4]$ as shown in FIG. 10, for example.

Thus, according to the optical signal processing device of the second embodiment, it becomes possible to realize the processing of the optical signals that are multiplexed on a time axis such as interchanges of time-slots while maintaining these signals in the state of optical signals.

Figure 5:
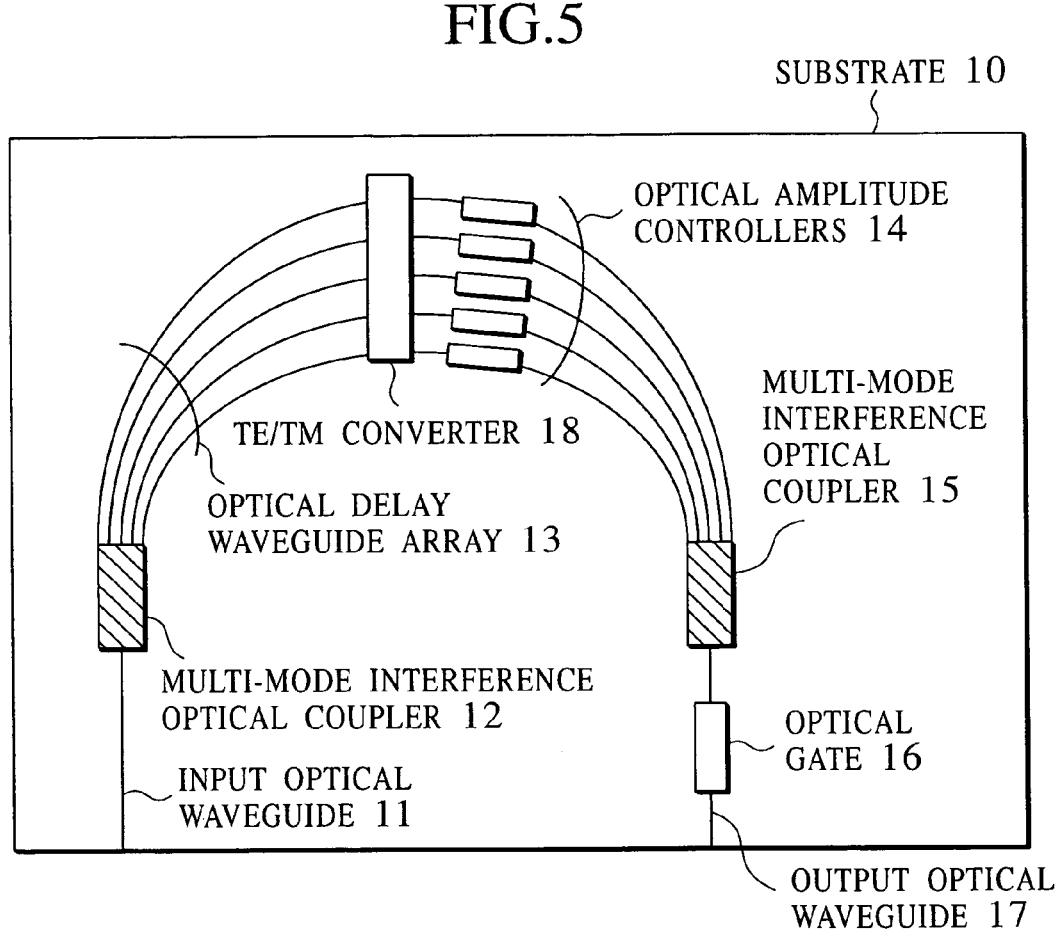
FIG. 5 is a block diagram showing another modified configuration of an optical signal processing device according to the first embodiment of the present invention.

Note that, in the optical signal processing device of the second embodiment, it is also possible to realize the polarization independent operation by inserting a TE/TM converter in a middle of the optical delay waveguide arrays 23 and 26 similarly as in the case of FIG. 5 described above.

As described above, the optical signal processing device of the second embodiment uses an optical splitter for splitting input optical signals into plural sets, an optical delay waveguide array with mutually different delay amounts, optical gates for gating the optical signals lead to the optical delay waveguide array on a time axis, an optical switch for switching the gated optical signals, an optical delay waveguide array for delaying the optical signals switched by the optical switch, and an optical combiner for combining the delayed optical signals, so that it becomes possible to realize the processing of the optical signals that are multiplexed on a time axis such as interchanges of time-slots or changes of the signal speeds using different delay amounts, and therefore it becomes possible to provide the optical signal processing device that can handle high speed optical signals in an optical region. Such a processing of the optical signals can be utilized for the rewriting of information on a destination of the optical signals, for example.

As described, according to the optical signal processing device of the present invention, it becomes possible to realize the digital-to-analog conversion of the input optical signals in an optical region, without converting the input optical signals into electric signals for the purpose of signal processing, by splitting input optical signals into plural sets, delaying the split optical signals for mutually different delay amounts while adjusting amplitudes of these optical signals, combining these optical signals, and gating these optical signals on a time axis, so that it becomes possible to handle high speed optical signals by using a relatively slow electric circuit.

Here, the contents of all bits of the optical signals can be recognized by adjusting the amplitudes of the optical signals such that the optical combiner combines the optical signals at respectively different intensities.

It is also possible to compensate the change of the phase shifts in lights due to the adjustment of the gain (or the loss) of the optical gate, by providing phase controllers in the optical delay waveguide array.

Also, according to the optical signal processing device of the present invention, it becomes possible to realize the processing of the optical signals that are multiplexed on a time axis such as interchanges of time-slots, without converting the input optical signals into electric signals for the purpose of signal processing, by splitting input optical signals into plural sets, delaying the split optical signals for mutually different delay amounts, gating these optical signals on a time axis, interchanging the gated optical signals, delaying the interchanged optical signals for mutually different delay amounts, and combining these delayed optical signals, so that it becomes possible to handle high speed optical signals in an optical region.

In the optical signal processing device of the present invention, it is possible to realize the stable optical signal splitting and/or combining by a compact configuration, by using the multi-mode interference optical coupler for the optical splitter and/or the optical combiner.

Also, in the optical signal processing device of the present invention, it is possible to realize the polarization independent operation in the device as a whole, even when the optical delay waveguide array has birefringence, by inserting a TE/TM converter in a middle of the optical delay waveguide array.

It is also to be noted that, besides those already mentioned above, many modifications and variations of the above embodiments may be made without departing from the novel and advantageous features of the present invention.

Accordingly, all such modifications and variations are intended to be included within the scope of the appended claims.

What is claimed is:

1. An optical signal processing device, comprising:
   an input optical waveguide;
   an optical splitter configured to split optical signals multiplexed on a time axis that are entered at the input optical waveguide into plural sets;
   an optical delay waveguide array formed by a plurality of optical delay waveguides with mutually different delay amounts in units of time-slots which are configured to delay the optical signals split by the optical splitter;
   an optical combiner configured to combine the optical signals delayed by the optical delay waveguide array;
   an output optical waveguide connected to an output port of the optical combiner; and
   an optical gate configured to gate the optical signals, outputted from the optical combiner or entered into the optical delay waveguide array such that parts of the optical signals of different sets which come into a prescribed time-slot region at the identical timing are extracted simultaneously at the identical timing;
   wherein at least one of the optical splitter, the optical delay waveguide array, the optical combiner, and the optical gate has an optical amplitude adjustment function for adjusting amplitudes of the optical signals; and
   wherein the optical signal processing device is a purely optical device for optically processing the optical signals multiplexed on the time axis that operates entirely in an optical region.

2. The optical signal processing device of claim 1, wherein the optical delay waveguide array delays the optical signals and the optical amplitude adjustment function adjusts the amplitudes of the optical signals such that an amplitude of an output signal of the optical gate represents a digital-to-analog converted value of the optical signals.

3. The optical signal processing device of claim 1, wherein the input optical waveguide, the optical splitter, the optical delay waveguide array, the optical combiner, the output optical waveguide, and the optical gate are provided on a substrate, and the optical gate is provided between the optical combiner and the output optical waveguide.

4. The optical signal processing device of claim 1, wherein the input optical waveguide, the optical splitter, the optical delay waveguide array, the optical combiner, and the output optical waveguide are provided on a substrate, and the optical gate is provided outside the substrate and connected to the output optical waveguide.

5. The optical signal processing device of claim 1, wherein the optical gate includes a plurality of optical gate elements respectively provided on the optical delay waveguides of the optical delay waveguide array.

6. The optical signal processing device of claim 5, further comprising:
   a plurality of phase controllers respectively provided on the optical delay waveguides of the optical delay waveguide array after respective optical gate elements.

7. The optical signal processing device of claim 1, wherein the optical amplitude adjustment function adjusts the amplitudes of the optical signals such that the optical signals outputted from the optical delay waveguide array are combined by the optical combiner at respectively different intensities.

8. The optical signal processing device of claim 1, wherein the optical delay waveguides of the optical delay waveguide array are provided in forms of silica-based optical waveguides, and the optical amplitude adjustment function is realized by optical amplitude controllers respectively provided on the optical delay waveguides, each optical amplitude controller being provided in a form of a Mach-Zehuder optical switch having a thin film heater formed on a corresponding silica-based optical waveguide which is connected with a thin film heater functioning as an optical modulator.

9. The optical signal processing device of claim 1, wherein either one or each one of the optical splitter and the optical combiner is provided in a form of a multi-mode interference optical coupler.

10. The optical signal processing device of claim 1, further comprising:
    a TE/TM converter inserted in the optical delay waveguide array.

11. An optical signal processing device, comprising:
    an input optical waveguide;
    an optical splitter configured to split optical signals multiplexed on a time axis that are entered at the input optical waveguide into plural sets;
    a first optical delay waveguide array formed by a plurality of optical delay waveguides with mutually different delay amounts in units of time-slots which are configured to delay the optical signals spilt by the optical splitter;
    a plurality of optical gates configured to gate the optical signals respectively provided on the optical delay waveguides and configured to gate the optical signals entered into the optical delay waveguide array, such that parts of the optical signals of different sets which come into a prescribed time-slot region at the identical timing are extracted simultaneously at the identical timing;
    an optical switch for switching the optical signals outputted from the optical delay waveguide array;
    a second optical delay waveguide array formed by a plurality of optical delay waveguides with mutually different delay amounts in units of time-slots which are configured to delay the optical signals switched by the optical switch;
    an optical combiner configured to combine the optical signals delayed by the second optical delay waveguide array; and
    an output optical waveguide connected to an output port of the optical combiner,
    wherein the optical signal processing device is a purely optical device for optically processing the optical signals multiplexed on the time axis that operates entirely in an optical region.

12. The optical signal processing device of claim 11, wherein the first optical delay waveguide array delays the optical signals such that the optical gates extract a group of the optical signals at an identical timing, and the optical switch switches the optical signals so as to interchange signals within the group of the optical signals.

13. The optical signal processing device of claim 11, wherein the optical delay waveguides of the first optical delay waveguide array and the second optical delay waveguide array are provided in forms of silica-based optical waveguides, and the optical switch realizes a switching function at each intersection between each input and each output in a form of a Mach-Zehnder optical switch having a thin film heater formed on a corresponding silica-based optical waveguide.

14. The optical signal processing device of claim 11, wherein either one or each one of the optical splitter and the optical combiner is provided in a form of a multi-mode interference optical coupler.

15. The optical signal processing device of claim 11, further comprising:
a TE/TM converter inserted in the first and second optical delay waveguide arrays.

* * * * *